United States Patent [19]

Jordan

[11] Patent Number: 4,554,070
[45] Date of Patent: Nov. 19, 1985

[54] WEIR-TYPE SKIMMER EMPLOYING A WAVE DIFFUSER

[75] Inventor: Roland H. Jordan, Redondo Beach, Calif.

[73] Assignee: Chevron Research Company, San Francisco, Calif.

[21] Appl. No.: 537,462

[22] Filed: Sep. 29, 1983

[51] Int. Cl.⁴ .............................................. E02B 15/04
[52] U.S. Cl. ................................. 210/109; 210/242.3; 210/923
[58] Field of Search ..................... 210/924, 923, 242.3, 210/776, 242.4, 767, 799, 800, 805, 109; 414/137, 138; 405/26, 25, 63

[56] References Cited

U.S. PATENT DOCUMENTS

| | | | |
|---|---|---|---|
| 3,487,645 | 1/1970 | Frankel | 405/26 |
| 3,731,813 | 5/1973 | Tipton | 210/923 |
| 3,822,789 | 7/1974 | Crisafulli | 210/242.3 |
| 3,860,519 | 1/1975 | Weatherford | 210/242.1 |
| 3,983,034 | 9/1976 | Wilson | 210/242.1 |
| 4,033,876 | 7/1977 | Cocjin et al. | 210/242.3 |
| 4,049,554 | 9/1977 | Ayers | 210/242.3 |
| 4,367,977 | 1/1983 | Schaaf | 405/25 |
| 4,372,854 | 2/1983 | Szereday | 210/923 |
| 4,428,319 | 1/1984 | Henning et al. | 210/242.3 |

Primary Examiner—Richard V. Fisher
Assistant Examiner—Sharon T. Cohen
Attorney, Agent, or Firm—D. A. Newell; E. J. Keeling; P. L. McGarrigle

[57] ABSTRACT

A weir-type skimmer employing a wave diffuser for efficiently collecting an immiscible liquid from the surface of a body of higher density liquid in turbulent waters, including in combination: a floating containment boom having a wave diffuser disposed therein and a catch basin coupled therewith; a catch basin having a self-adjusting weir for regulating the flow of liquid therein; a water pump for removing and discharging water from the catch basin to the interior of the floating containment boom, forward of the wave diffuser; and an oil pump coupled with a skimming head for removing oil from the catch basin.

5 Claims, 3 Drawing Figures

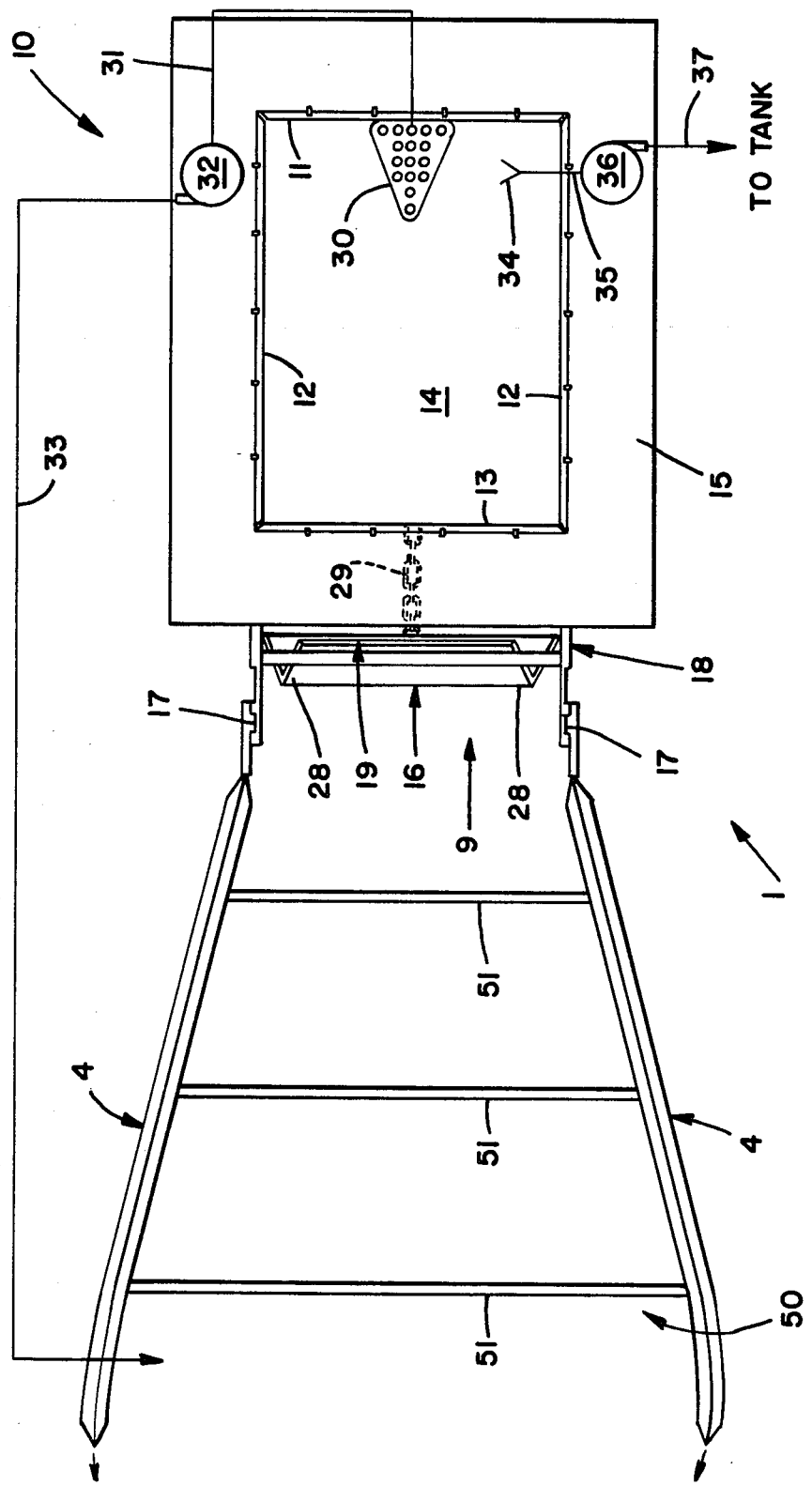

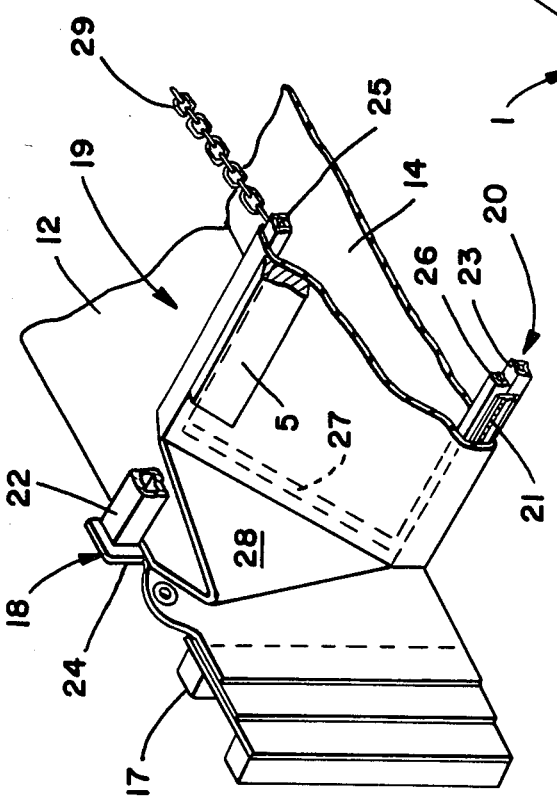
FIG_3
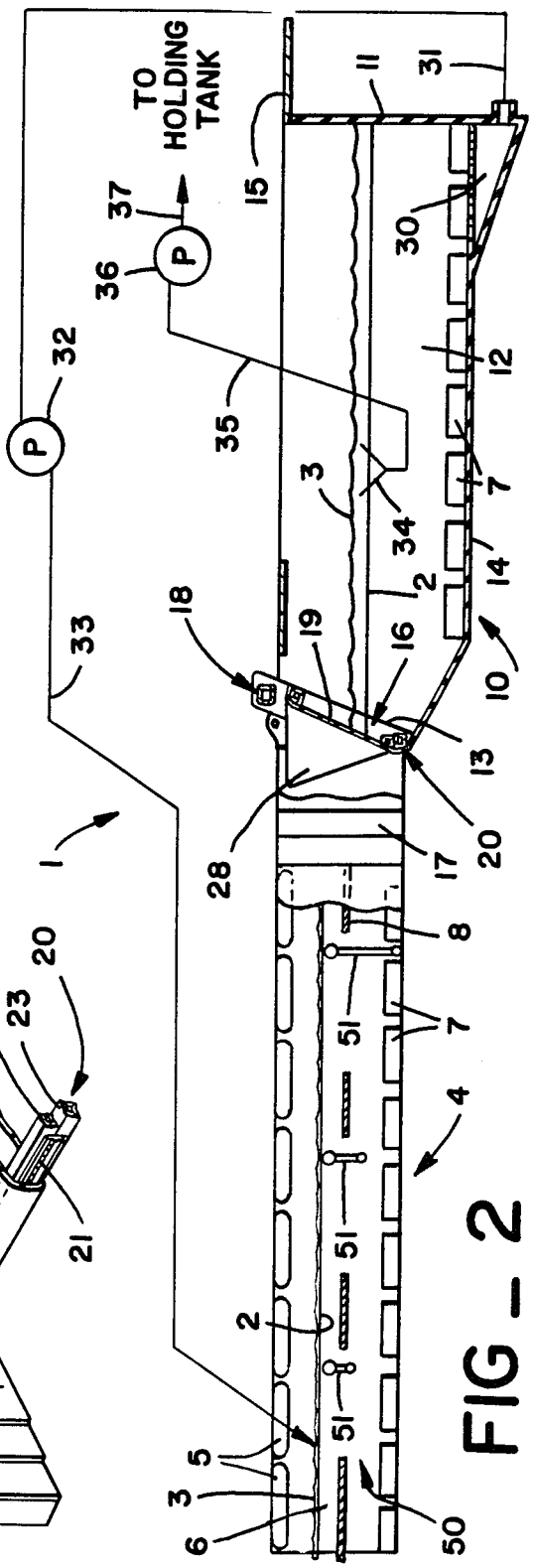
FIG_2

WEIR-TYPE SKIMMER EMPLOYING A WAVE DIFFUSER

CROSS-REFERENCE TO RELATED APPLICATION

This application is related to Application Ser. No. 526,565, titled "Method and Means for Collecting an Immiscible Liquid from the Surface of a Body of Higher Density Liquid", filed by Roland H. Jordan on Aug. 25, 1983.

INTRODUCTION

The present invention generally relates to apparatus for removing an immiscible liquid, such as oil, from the surface of a body of higher density liquid, such as water. The invention is applicable in connection with all bodies of liquid having floating matter thereon, particularly floating matter in its liquid state, and has particular utility and will be hereinafter described by way of example in connection with the removal of oil floating on water. The reference to oil and water is made simply as an example and is not to be limitative, as the subject invention has commensurate utility in removing any liquid floating atop another.

BACKGROUND OF THE INVENTION

As the supply of oil becomes more scarce, exploration and production activities are increasingly being performed at offshore locations. Attempts to recover offshore oil deposits for commercial use give rise to the possibility that accidental leaks may contaminate our oceans. Further possibilities for oil pollution arise during transportation of crude oil from its deposit location to the refinery or other destination.

To be effective, removal of oil from an oil spill must be rapid. As time elapses, spilled oil becomes more difficult to collect. It spreads rapidly and undergoes changes with time rendering the oil more dense. The weathering of the oil is related to the condition of the surrounding sea, temperature and oil type. Should spilled oil reach the shore, ecological damage and restoration costs increase astronomically.

Methods for removing hydrocarbon liquids and restoring the quality of the water to desired characteristics, include the use of chemical additives to cause a change in the characteristics of the oil; the use of various materials to absorb the oil from the water; and the use of confining devices and pumps to prevent the spread of oil and remove the oil from the surface of the water.

There are three major types of confining devices presently used to recover pollutants floating on a body of water. The first type is a weir-type skimmer, supported on the body of water, that generally permits the upper most surface of the body of water to flow into a sump, from which the accumulated liquid is pumped to a separating tank located aboard a floating vessel. The second type is a floating suction skimmer that sucks the upper surface of the water into a separating tank. The third type is an absorbent surface skimmer, combining the characteristics of both absorbent materials and confining devices. The typical absorbent surface skimmer includes a rotating absorbent belt removing oil from the water surface and depositing it in a collection pan.

Present weir-type skimmers share at least one of the following inadequacies: inability to operate effectively in other than substantially calm waters, inability to recover oil at rates desirable for a major spill, and inability to be deployed quickly because of size and weight. The first inadequacy is the most common of existing weight-type skimmers. As wave heights increase, the oil to water recovery rate decreases. A turbulent sea surface increases the flow of water into the skimmer.

The second inadequacy, low oil recovery rates, is due, in part, to the problem of wave heights, previously discussed, and also to design restrictions and deficiencies. A skimmer must be able to provide high volume flow rates for oil slicks of different depths. The recovery device should be able to operate effectively in both very thin and very thick oil slicks and be capable of adjusting output relative to the amount of oil recovered.

The last inadequacy concerns deployment of the skimmer. Storage, transport and operation of the skimmer become increasingly difficult with size and weight gains.

The present invention provides a weir-type skimmer employing a wave diffuser for retrieving oil from the surface of a body of water which is not subject to the deficiencies of the prior art.

SUMMARY OF THE INVENTION

The present invention combines elements of a weir-type skimmer, floating suction skimmer and a wave diffuser, and add new components, providing an apparatus superior to the prior art. The system of the present invention provides efficient collection of oil and includes a combination: a floating containment boom, including a wave diffuser and an outlet opening; a catch basin, including floatation to maintain its upper-most edge above the oil, a sump and an inlet opening, the boom outlet opening coupled therewith; a self-adjusting weir disposed within the catch basin inlet opening to regulate the flow of liquid into the basin; a water pump coupled with the catch basin sump to remove and discharge water therefrom; and an oil pump coupled with a skimming head for removing and discharging oil therefrom.

The floating containment boom guides the oil slick passed the wave diffuser to the basin inlet opening where it is directed over a self-adjusting weir disposed therein. The self-adjusting weir aids in separating the oil from the subjacent water. Oil and a limited amount of water directed over the self-adjusting weir, pass into the catch basin. The water within the basin is pumped from the sump and transported to the interior of the floating containment boom forward of the wave diffuser, for recycling in accordance with the foregoing described procedure. The oil within the basin is pumped from the skimming head location therein to a containment facility for processing.

THE PRINCIPAL OBJECT OF THE INVENTION

An object of the present invention is to provide a skimmer capable of operating in turbulent waters, capable of recovering oil rapidly and capable of being readily transported and assembled.

Another object of the invention is to provide a skimmer by which floating pollutants, such as oil, along with a thin layer of higher density liquid, such as water, may be efficiently collected in turbulent waters and be substantially separated; the oil transported to a containment facility for processing.

Another object of the present invention is to provide a skimmer by which floating pollutants, such as oil, along with a thin layer of higher density liquid, such as water, may be efficiently collected in turbulent waters and be substantially separated; the water transported to the interior of the containment boom, forward of a wave diffuser disposed therein.

A further object of the invention is to provide a skimmer in accordance with the preceding object while simultaneously removing and transporting the oil collected in a catch basin to a containment facility for processing.

Additional objects and advantages of the present invention will become apparent from a detailed reading of the specification and drawings which are incorporated herein and made a part of this invention.

BRIEF DESCRIPTION OF THE DRAWINGS

FIG. 1 is a schematic plan view of a skimmer, according to an embodiment of the present invention, floating on a body of water from which a surface layer of oil is to be skimmed.

FIG. 2 is a schematic representation in elevation of the skimmer of FIG. 1.

FIG. 3 is a developed view of the self-adjusting weir section of FIGS. 1 and 2.

DESCRIPTION OF THE PREFERRED EMBODIMENT

Referring now in detail to the drawings, and in particular to FIGS. 1 and 2, a skimmer 1 is located in a body of water 2. An immiscible liquid 3, such as oil, floats atop the higher density liquid 2.

A floating oil containment boom 4 is constructed from material causing it to be impermeable to water, oil and air. Floatation chambers 5 extend along the upper most edge of the boom 4 or are incorporated therein to maintain the upper most boom edge above the oil, forming a barrier for the contaminants. The floatation chambers 5 are preferably individualized compartments to selectively buoy the boom and to provide flexibility. The sides or skirts 6 of the boom extend below the floatation chambers 5 and incorporates elements hereinafter described. Ballast 7 extends along the lower most edge of the skirt 6 or is incorporated therein, to maintain the skirt 6 in its submerged state. Ballast 7 may include a chain or chambers containing lead sheeting. Individual chambers provide selective ballasting and skirt flexibility in the area of the ballast.

Although the fabric from which the boom is constructed is suitable for ordinary handling, it is not designed to withstand the high tensile stresses imposed upon the boom from waves, wind and current. Tensile cable 8 placed in the skirt 6 and extending along its longitudinal median provides means for accepting and distributing the stresses to prevent damage to the fabric of the boom.

A wave diffuser 50 is disposed within the containment boom 4 to reduce turbulence and increase the velocity of oil therein. Wave diffuser 50 consists of a plurality of variably fixed weir 51 spanning the width of the containment boom 4 and serially disposed therein. The upper edges of the plurality of variably fixed weir 51 are located near the water level 2 and the lower edges extend below. Means for positioning the plurality of variably fixed weir 51 at a predetermined distance relative to the surface of the oil and means for positioning the plurality of variably fixed weir 51 at a predetermined angle relative to the surface of the oil provide the ability to vary the velocity and depth of liquid passing thereby. The distance each individual variably fixed weir extends below the water surface 2, otherwise referred to as the weir height, is dependent upon its position within the containment boom 4. As the distance from the mouth of the containment boom increases, so does the height of each individual variably fixed weir.

Boom outlet opening 9 directs liquid into catch basin 10. Catch basin 10 is constructed of material similar to that of the containment boom 4. A rear wall 11, side walls 12, front wall 13 and bottom wall 14 cooperate to define a generally rectangular shaped receptacle or basin. Boom connector 17, located on the basin side walls 12 and boom skirt 6, provides means for joining the boom 4 and basin 10.

Although floatation may extend along the upper most edge of the basin or be incorporated therein to maintain the upper most basin edge above the oil, the preferred embodiment illustrates a floating deck 15 encompassing the basin perimeter to which the basin is lashed. Ballast 7 extends along the lower most edge of the front wall 13, rear wall 11 and side walls 12, or is incorporated therein to maintain the basin configuration. Like the boom ballast, the basin ballast may include a chain or lead sheeting. Individualized chambers provide selective ballasting and flexibility. Alternatively, rigid framing may extend below the floating deck to which the walls are lashed, thereby maintaining the basin configuration.

The front wall 13 of the basin 10 is provided with an inlet opening 16 which extends horizontally and vertically in the front wall 13 so that the lower most edge thereof is below the water level to assure gravity inflow of water and oil into the catch basin 10. The relationship of the oil level to the inlet opening 16 is representively illustrated in FIG. 2, but this relationship may vary depending upon the floatation characteristics of the basin and is not critical except that the lower edge of the basin inlet opening 16 must be below the water level of the body of water 2. Inlet framing 18, detailed in FIG. 3, including upper 22, lower 23, and side 24 inlet framing members, defines the perimeter of the basin inlet opening 16 and maintains the rigid inlet opening shape.

Disposed within the inlet opening 16 is a self-adjusting weir 19. FIG. 3 illustrates a developed view of the self-adjusting weir 19 of FIGS. 1 and 2. Weirs 19 and 51 are constructed from a material similar to that of the boom 4 and basin 10. Self-adjusting weir 19 substantially simulates the configuration and size of inlet opening 16. Self-adjusting weir framing 20, including upper 25, lower 26 and side 27 self-adjusting weir framing members, maintains the rectangular configuration of the self-adjusting weir. Hinged connection 21 joins lower self-adjusting weir framing member 26 with lower inlet framing member 23. Floatation 5 extends along the upper most edge of the self-adjusting weir 19 or may be incorporated therein to maintain the upper most edge of the self-adjusting weir at a desired elevational position in relation to the surface of the body of water 2, independent of changes in elevational position of the catch basin. Wing hinges 28, located between the side self-adjusting weir framing members 27 and side inlet framing members 24, prevent fluid from passing therebetween. Chain 29, connected with upper self-adjusting weir framing member 25, provides means for manually adjusting the self-adjusting weir elevation relative to the body of water 2.

Sump 30, located within the bottom wall 14, substantially receives water accumulated within the catch basin 10. Water pump inlet hose 31 is coupled with sump 30. Water pump 32, located on deck 15, transports water from water pump inlet hose 31 through water pump discharge hose 33 to the interior of the floating containment boom 4, forward of wave diffuser 50.

Skimming head 34, located within catch basin 10 and immediately above the oil/water interface, receives oil accumulated within the basin. Oil pump inlet hose 35 is coupled with skimming head 34. Oil pump 36 transports oil from oil pump inlet hose 35 through oil pump outlet hose 37 to a containment vessel (not shown) for further processing.

Although the preferred embodiment incorporates the above-described means for transporting water, the inventive concept of the present invention does not require such and its proper operation is not dependent thereon. Likewise, although the preferred embodiment incorporates the above-described means for transporting oil, catch basin 10 may be concurrently utilized as a containment vessel in which oil may be stored to await further processing, thereby avoiding the necessity for oil transporting means.

In operation, two tow boats will be connected, in the vicinity of the oil spill, to the opposite ends of the floating containment boom 4 for movement in the direction of the oil spill as indicated by arrows in FIG. 1. The boom 4 will assume a parabolic contour in response to tow movement. Alternatively, a support device to maintain the parabolic contour of containment boom 4 may extend from basin floating deck 15 to boom 4, thereby allowing basin 10 to be propelled rather than drawn by tow boats. Oil and water are trapped by the boom 4 and are funneled over wave diffuser 50 toward the catch basin 10. Oil and water funnel through boom outlet opening 9 toward self-adjusting weir 19 disposed within catch basin inlet opening 16.

Self-adjusting weir 19 is defined as being self-adjustable, but may be manually adjusted utilizing chain 29, if so desired. Self-adjusting weir 19 regulates the flow of liquid into catch basin 10. Wave diffuser 50 reduces turbulence and increases velocity, allowing self-adjusting weir 19 to efficiently skim a surface layer of oil and a limited amount of water into catch basin 10.

Oil and water are simultaneously removed from catch basin 10. If the rate of admission of liquid into catch basin 10 is greater than the discharge of pumps 32 and 36, then the buoyancy of the self-adjusting weir will cause it to rise so as to reduce or discontinue the flow of liquid over the self-adjusting weir 19.

Water pump 32, located on deck 15, pumps water from sump 30 located within catch basin bottom wall 10, through water pump inlet hose 31 and water pump discharge hose 33, discharging the water into the interior of the boom 4, forward of wave diffuser 50, thus enabling the water to be recycled according to the foregoing described procedure. Oil pump 36 pumps oil from skim head 34, located within catch basin 10 and immediately above the oil-water interface, through oil pump inlet hose 35 and oil pump outlet hose 37 to the containment vessel for further processing.

Since many modifications and variations of the present invention are possible within the spirit of this disclosure, it is intended that the embodiment disclosed is only illustrative and not restrictive, reference being made to the following claims rather than to the specific description to indicate the scope of this invention.

What is claimed is:

1. A wave diffusing apparatus for collecting oil from the surface of a body of water when used in combination with a skimming apparatus that moves through the body of water, comprising:
    a plurality of submerged, serially disposed spaced apart parallel weirs of different height located substantially perpendicular to the line of fluid flow, said series of weirs increasing in height from the point at which a floating layer is first encountered along the direction of the relative fluid flow to form partial barriers to the fluid flow;
    means for positioning said weirs in front of a liquid inlet for a skimmer at a predetermined distance below the surface of the body of water; and
    means for adjusting the position, both vertically and angularly, of said weirs in the liquid body.

2. The wave diffusing apparatus as recited in claim 1 where the predetermined distance below the surface of the body of water is the same for all of said weirs.

3. An apparatus for collecting oil from the surface of a body of water, comprising:
    a catch basin having a closed bottom and an open top, and made of flexible material which is impervious to air, oil and water;
    a flexible floatation means for flexibly supporting said catch basin above the water to allow said catch basin to ride the surface of the water in a serpentine fashion without regard to fluctuations in the water surface height;
    a liquid inlet formed in said catch basin;
    a floatation boom to assist in directing the surface oil toward said liquid inlet;
    a self-adjustable weir horizontally disposed in said liquid inlet of said catch basin;
    means for vertically hinging on both sides of said self-adjustable weir to said catch basin so that all liquids are forced over the top of the weir and prevented from going around the ends of said self-adjustable weir;
    a liquid outlet located in the bottom of said catch basin, to permit water removal from beneath the overlying oil layer in said catch basin and to establish flow over the top of said self-adjustable weir thereby increasing concentration of oil in the catch basin;
    a first pump to remove the water from said catch basin through said liquid outlet and to pump water back into said body of water to assist in directing the oil over said self-adjustable weir;
    a second pump to remove the oil from the basin, the intake from the second pump being maintained in the oil phase above the oil-water interface;
    a plurality of serially disposed, substantially parallel weirs located at the same depth below the surface of the body of water and extending downward to a variety of different depths, the depths to which said parallel weirs extend increase from the first weir that encounters the relative fluid flow to the last weir which is positioned adjacent to said liquid inlet for said catch basin;
    means for positioning said parallel weirs at a predetermined distance below the surface of the body of water; and
    means for variably positioning, both vertically and angularly, said parallel weirs in the fluid body.

4. Apparatus for collecting an immiscible liquid, such as oil, from the surface of a body of higher density liquid, such as water, comprising:
   (a) a catch basin, including a bottom member and an inlet opening, said basin supported to maintain its uppermost edge above said immiscible liquid;
   (b) a self-adjusting weir disposed within said basin inlet opening for regulating the flow of liquid into said basin;
   (c) immiscible liquid removal means for removing said immiscible liquid from said basin;
   (d) a floating containment boom, including an outlet opening, said outlet opening coupled to said basin inlet opening; and
   (e) a wave diffuser disposed within said containment boom which includes:
      (i) a plurality of variably fixed weir coupled to said containment boom and serially disposed therein, said plurality of variably fixed weir forming a series of barriers within said containment boom that increase in height as the distance from said self-adjusting weir decreases;
      (ii) means for positioning said plurality of variably fixed weir at a predetermined distance relative to the surface of said immiscible liquid; and
      (iii) means for positioning said plurality of variably fixed weir at a predetermined angle relative to the surface of said immiscible liquid.

5. Apparatus for collecting an immiscible liquid, such as oil, from the surface of a body of higher density liquid, such as water, comprising:
   (a) a catch basin, including a bottom member and an inlet opening, said basin supported to maintain its uppermost edge above said immiscible liquid;
   (b) a self-adjusting weir disposed within said basin inlet opening for regulating the flow of liquid into said basin;
   (c) higher density liquid removal means for removing said higher density liquid from said basin;
   (d) a floating containment boom, including an outlet opening, said outlet opening coupled to said basin inlet opening; and
   (e) a wave diffuser disposed within said containment boom which includes:
      (i) a plurality of variably fixed weir coupled to said containment boom and serially disposed therein, said plurality of variably fixed weir forming a series of barriers within said containment boom that increase in height as the distance from said self-adjusting weir decreases;
      (ii) means for positioning said plurality of variably fixed weir at a predetermined distance relative to the surface of said immiscible liquid; and
      (iii) means for positioning said plurality of variably fixed weir at a predetermined angle relative to the surface of said immiscible liquid.

* * * * *